United States Patent [19]
Hickox et al.

[11] Patent Number: 5,272,580
[45] Date of Patent: Dec. 21, 1993

[54] THREE-POINT TOP COVER WITH LIMITER FOR A DISC DRIVE

[75] Inventors: Thomas A. Hickox; Iraj Jabbari, both of Santa Clara County; Ramgopal Battu, Los Angeles County, all of Calif.

[73] Assignee: Seagate Technology, Inc., Scotts Valley, Calif.

[21] Appl. No.: 22,768

[22] Filed: Feb. 25, 1993

Related U.S. Application Data

[63] Continuation of Ser. No. 611,301, Nov. 9, 1990, abandoned.

[51] Int. Cl.⁵ .............................................. G11B 17/02
[52] U.S. Cl. ................................ 360/97.02; 174/52.3
[58] Field of Search ............... 360/97.02, 97.03, 97.04; 174/35 GS, 52.3; 220/378

[56] References Cited

U.S. PATENT DOCUMENTS

| | | | |
|---|---|---|---|
| 4,725,904 | 2/1988 | Dalziel | 360/97.02 |
| 5,150,267 | 9/1992 | Reinisch | 360/97.02 |

*Primary Examiner*—Robert S. Tupper
*Attorney, Agent, or Firm*—Flehr, Hohbach, Test, Albritton & Herbert

[57] ABSTRACT

The above objectives are achieved in the present invention by providing a top cover and base which are attached at only three points, and which incorporate a number of limiting surfaces on each, cooperating with mating surfaces on the other, to define the proximity of the two parts as assembled, and thus limit and determine the compression of the gasket between the two parts.

14 Claims, 3 Drawing Sheets

THREE-POINT TOP COVER WITH LIMITER FOR A DISC DRIVE

This is a continuation of application Ser. No. 07/611,301 filed Nov. 9, 1990 now abandoned.

This invention relates to disc drive data storage devices and more particularly to an improved top cover for the housing of the disc drive that prevents distortion of the disc drive when the top cover is fastened to the drive housing and also prevents unwanted displacement of the gasket between the top cover and disc housing.

BACKGROUND OF THE INVENTION

Disc drives of the type in which the present invention is particularly useful are well known in the industry, and are frequently referred to as "Winchester" disc drives.

Disc rives of this type include a sealed housing in which the principal components are enclosed. These components include a spindle motor having a hub on which one or more rigid discs are mounted for rotation. This spindle motor is usually of the brushless DC type and spins the discs at 3600 RPM or a similar high speed. Each disc surface contains a large number of circular, concentric data tracks on which data are recorded and from which these data can later be retrieved. The processes of recording and retrieving data are referred to as "writing" and "reading" respectively.

There is typically a single read/write head associated with each surface of each disc, although several designs have included more. The read/write heads are under control of electronic circuitry, allowing access to all of the data tracks.

These read/write heads are usually one of two types:

1. an interrupted ferrite ring wound with wires for inducing flux changes in the disc media to write data, and sensing changes in flux to read data, or;
2. an analogous arrangement formed using the thin-film deposition technology of the semi-conductor industry.

Whichever type of read/write head is used, the heads themselves are incorporated in or mounted to a sled-like structure called a slider. The slider typically has two elongated, flat lower surfaces called air bearing surfaces (ABS), analogous to the runners on a sled. These ABS are designed and dimensioned to "fly" the head over the surface of the disc on a thin layer of air dragged along by the rapidly spinning disc. Disc drives of the current technology fly the heads at a distance from the heads of less than ten microinches (0.000010 inch).

Because of the size of the flying height, any contaminant within the disc drive could disrupt the proper relationship between the head and the disc, and potentially cause permanent damage to the head and/or disc. Therefore, the discs and heads, plus the mechanisms for moving them, are sealed in a "bubble" to maintain the necessary degree of cleanliness.

This bubble is commonly formed by a base casting—to which are mounted the spindle motor and discs and the actuator mechanism for moving the heads sealed to a top cover. There is usually some sort of gasket between the base and the top cover to provide the needed cleanliness seal.

The top cover is usually secured to the base with a multiplicity of screws. In prior art applications, extreme care must be exercised to squeeze the gasket to a great enough extent to seal the drive and yet not so tight as to distort the gasket, which could result in excess leakage and thus contamination.

Another drawback of previous designs is that, when the top cover is securely screwed to the base, excessive distortional stresses can be exerted on the base, resulting in unwanted changes in the geometric relationship between the various sub-assemblies mounted to the base casting. These stresses can be especially detrimental when thermally induced expansion or contraction of the components occurs during the use of the disc drive.

OBJECTIVES OF THE INVENTION

It is an objective of the invention to provide a top cover, gasket and base casting combination that will provide the necessary sealing capability for cleanliness without distorting the gasket material.

It is another objective of the invention to provide a modified means of attaching the top cover to the base casting that eliminates or minimizes the mechanical stresses placed on the two parts when they are assembled together.

SUMMARY OF THE INVENTION

The above objectives are achieved in the present invention by providing a top cover and base which are attached at only three points, and which incorporate a number of limiting surfaces on each, cooperating with mating surfaces on the other, to define the proximity of the two parts as assembled, and thus limit and determine the compression of the gasket between the two parts.

DESCRIPTION OF THE DRAWINGS

The features and advantages of the present invention may be best understood by studying the attached figures, wherein.

DETAILED DESCRIPTION OF THE INVENTION

Figure 1:
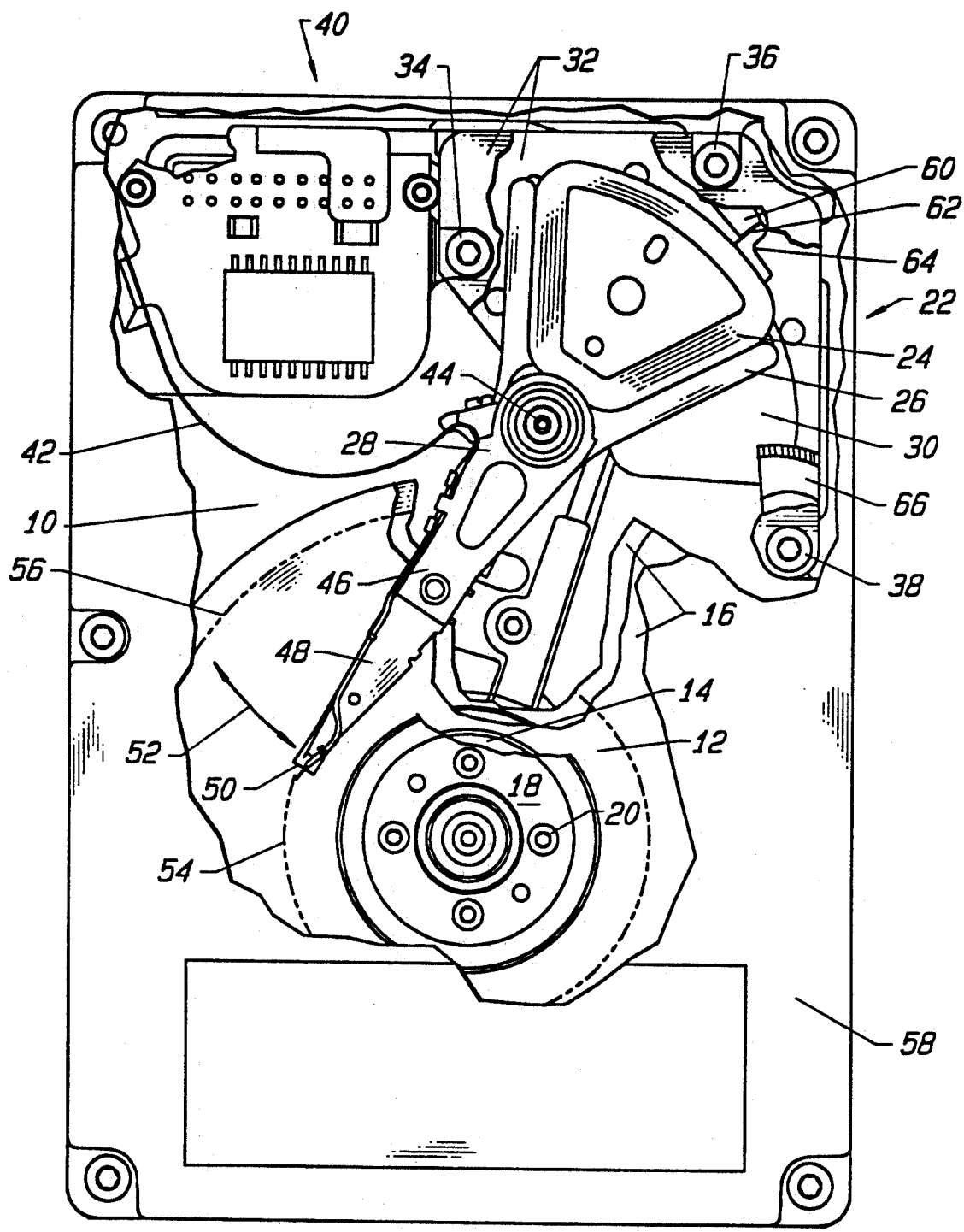
FIG. 1 is a plan view of a disc drive incorporating the present invention.

Referring first to FIG. 1, shown is a rigid disc drive data storage device of the type in which the present invention is particularly useful. This example disc drive is of the rotary/VCM type. FIG. 1 contains many partial cutaways to show details of the assembly.

The disc drive consists of a base housing 10 to which other components are mounted. A spindle motor, shown generally at 12, is mounted to the base housing 10 and carries a hub 14 on which the discs 16 are supported. The discs 16 are secured to the hub 14 by a disc clamp 18 held by screws 20. In this example, the discs will be spinning in the counter-clockwise direction as viewed.

A voice coil motor (VCM), shown generally at 22, is made up of a flat coil 24 mounted between two coil mounting arms 26 that are part of a Y-shaped actuator arm 28. The VCM is also made up of a pair of permanent magnets above and below the coil 24—one of which is shown at 30—attached to steel plates 32 spaced apart by standoffs 34, 36, 38. Electronic circuitry, some of which is shown generally at 40, supplies controlled DC current to the coil 24 via a printed circuit cable 42 to energize the coil 24, inducing magnetic flux which interacts with the magnetic field of the permanent magnets 30 to move the coil 24 and attached actuator arm 28 about a pivot point 44. The third portion of the actuator arm 28 is made up of several head mounting arms 46 which carry a number of load beam/gimbal assemblies (LGA) 48 to which are attached the read/write heads 50. As the actuator arm 28 pivots about the pivot point 44, the heads 50 are selectively moved along arc 52 to any of the data tracks lying between the innermost data track 54 and the outermost data track 56.

The entire assembly is enclosed by a top cover 58 mated to the base housing 10.

It can be easily appreciated that the proper operation of the disc drive requires a precise geometric relationship between the various subassemblies and components. For instance, in order for the read/write heads 50 to move in parallel with the surface of the discs 16, the spin axis of the spindle motor 12 must be parallel to the pivot axis of the actuator arm 28 about the pivot point 44.

Figure 2:
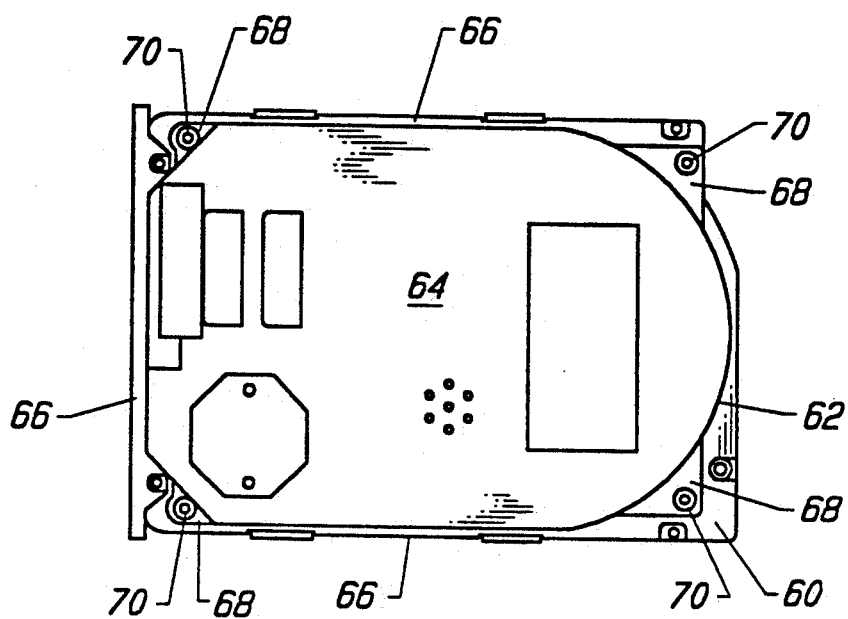
FIG. 2 is an assembly drawing of a prior art disc drive.

Shown in FIG. 2 is a plan drawing of a disc drive from the prior art in its assembled condition. Visible in this view is the base casting 60 which is a generally planar element to which the internal components are mounted as previously shown in FIG. 1.

Shown also in FIG. 2 is a top cover 62 which consists of a flat portion 64 with downward extending side walls 66 which provide the depth necessary to cover the internal components. At the bottom of the downward extending side walls 66 and generally in the four corners of the top cover 62 are four tabs 68 formed such that the bottom surface of the tabs 68 is coplanar with the bottom of the downward extending sidewalls 66. A screw 70 in each of the tabs 68 secures the top cover 62 to the base casting 60.

A gasket (not shown) of compressible material is constrained between the periphery of the top cover 62 and the base casting 60 to provide a sealed, contaminant-free environment inside the disc drive.

The primary drawback of this type of design lies in the number of attachment points between the top cover 62 and the base casting 60. Many other prior art designs incorporated an even larger number of screws holding the top cover to the base casting with the intention of providing a tighter seal.

Since it is known that any three points define a plane, it is evident that a certain amount of difficulty is to be expected if more than three points must be co-planar. Allowing for typical manufacturing tolerances, some lack of planarity in such components is inevitable. When two components are fastened together at more than three points, this lack of planarity can be exacerbated.

With the disc drive of FIG. 2, a variation in planarity between the four tab surfaces of the top cover combined with any such variation in planarity in the four corners of the base casting could easily result in stress on the base casting and cause distortion in that element.

This type of stress and attendant distortion can become further exaggerated when it is recalled that disc drives are expected to function correctly over a fairly wide range of ambient temperature, e.g., 5°-50° C. (41°-122° F.). Differential thermal expansion between the two components can induce greater stress and, therefore, greater distortion.

Since proper operation of the disc drive depends on the spin axis of the spindle motor—and therefore the discs—being parallel to the pivot axis of the actuator, this type of stress should be avoided.

A second disadvantage in the design of the disc drive of FIG. 2 relates to the gasket between the top cover and the base casting. As previously mentioned, with this design the gasket is simply squeezed between the edge of the top cover and the planar base casting. With this type of assembly, small point-to-point variations in the density of the gasket material can cause the gasket to twist or be displaced laterally when the top cover and base casting are screwed together. Obviously, this can result in a loss of sealing capability and invite contamination of the internal components.

Figure 4:
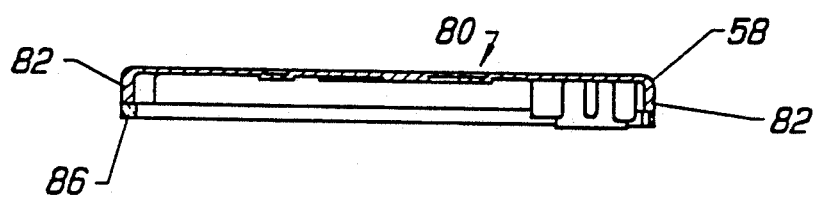
FIG. 4 is a sectional view of the top cover and gasket assembly of the present invention taken along line A—A of FIG. 3.
Figure 3:
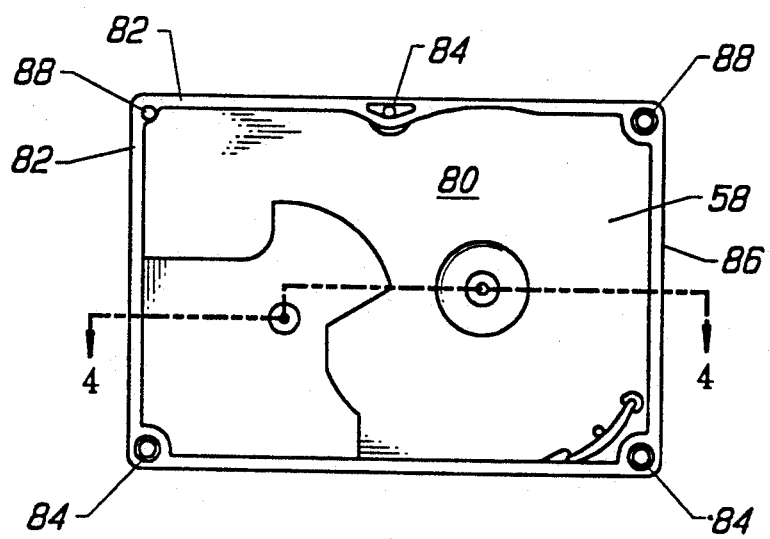
FIG. 3 is a plan view of the underside of the top cover and gasket assembly of the present invention.

Turning now to FIGS. 3 and 4, shown is the top cover and gasket assembly of the present invention. The top cover 58 consists of a flat portion 80 and a continuous periphery of downward extending sidewalls 82. Three screw holes 84 are provided to mount the top cover and gasket assembly to the base casting (not shown). Two of the screw holes 84 lie in corners of the top cover 58 along the long axis of the top cover, and the third screw hole 84 is located approximately midway along the opposite long side of the top cover 58. This three-point attachment minimizes the stresses and distortion discussed above.

Also shown in FIGS. 3 and 4 is the gasket 86 used to seal the top cover 58 and base casting (not shown) not a contamination-free environment. This gasket 86 is adhesively attached to the bottom surface of the downward extending sidewalls 82. In order to prevent distortion and displacement of the gasket 86 caused by excessive squeezing of the gasket 86, the top cover incorporates a plurality of limiting surfaces. The first two 88 of these limiting surfaces lie in the corners of the top cover 58 that do not have screw holes 84.

Figure 5:
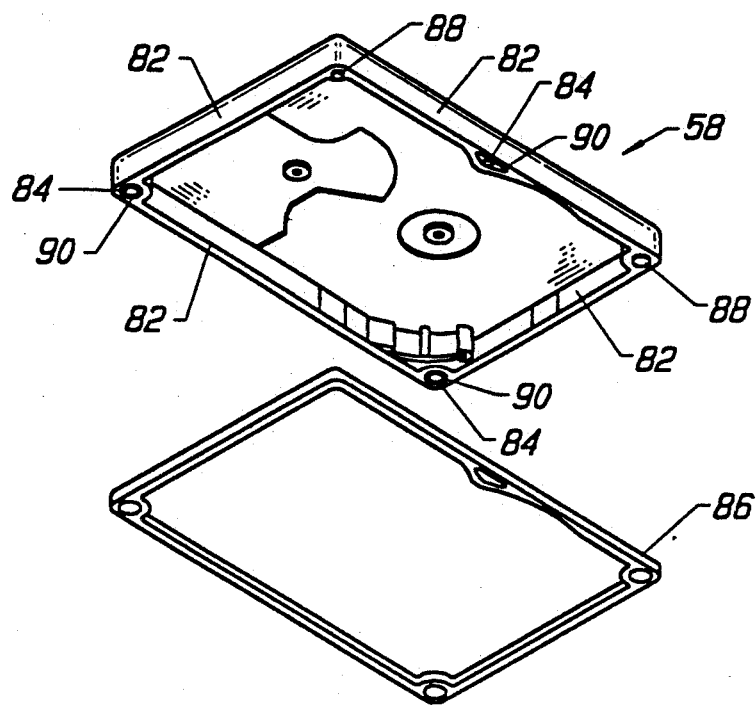
FIG. 5 is an isometric view of the top cover and gasket of the present invention.

These two limiting surfaces and the remainder of these surfaces are most readily seen by referring to FIG. 5.

In FIG. 5, the top cover 58 and gasket 86 are shown in isometric view in their unassembled condition. The first two 88 of the limiting surfaces are seen to be circular pads extending a short distance downward beyond the extent of the sidewalls 82. The other three limiting surfaces 90 surround the three screw holes 84 and extend beyond the lower surface of the sidewalls by the same amount as the first two limiting surfaces 88.

The amount that these limiting surfaces 88, 90 extend beyond the lower surface of the side wall is less than half the thickness of the uncompressed gasket 86. The reason for this dimension is best understood by referring to FIG. 6.

Figure 6:
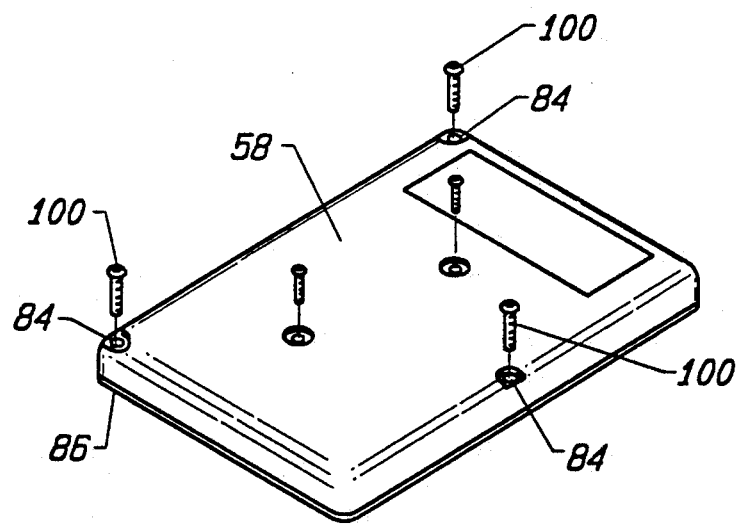
FIG. 6 is an assembly drawing of a top cover, gasket and base casting incorporating the present invention.
Figure 6:
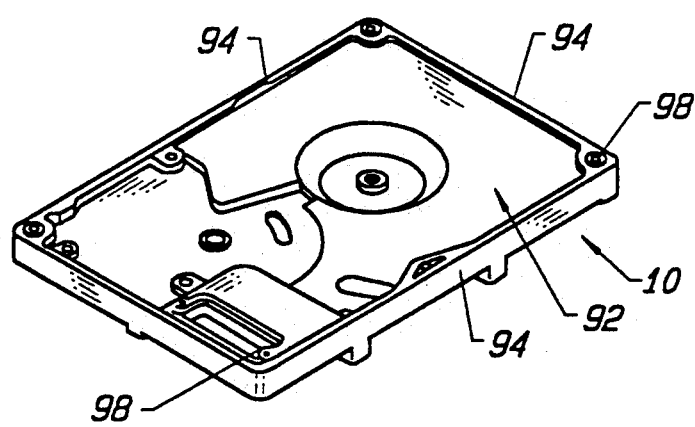

FIG. 6 is an isometric view of the top cover 58 and gasket 86 assembly and the base casting 10 showing how they would be assembled together. In this view, the spindle motor 12, discs 16, actuator arm 28, actuator motor 22 and all other internal components of FIG. 1 have been omitted for clarity.

As can be seen in FIG. 6, the base casting consists of a basically planar center section completely surrounded by four upwardly extending base sidewalls 94. The base casting 10 also has three screw holes corresponding to the three screw holes 84 in the top cover 58. Surrounding the three screw holes in the base casting 10 are three raised limiting surfaces 96 corresponding to and mating with the limiting surfaces surrounding the screw holes 84 in the top cover 58. In the two corners of the base casting 10 which do not have screw holes, are two additional raised limiting surfaces 98, which are circular pads corresponding to and mating with the similar structures on the top cover 58. Again, the height of the raised limiting surfaces 96, 98 above the top of the sidewalls 94 is less than half the thickness of the uncompressed gasket 86.

When the screws 100 are inserted through the top cover 58 and gasket 86 and tightened into the corresponding tapped holes in the base casting 10, the only points of contact between the top cover and the base casting 10 are the limiting surfaces, and the only fixed points of contact are the limiting surfaces surrounding the screw holes. This ensures that a single plane exists at these points.

Furthermore, since the other two contact points do not have screws securing them together, any differential thermal expansion between the top cover and the base casting will result in slip-page in these areas, thus minimizing any distortion of the base casting, and maintaining the proper geometric relationship between the various components mounted to the base casting.

Also, since, as previously noted, the limiting surfaces on both the top cover 58 and the base casting 10 extend less than half the thickness of the gasket 86 beyond their respective side walls, when the top cover 58 is screwed to the base casting 10, the gasket 86 will be compressed between the two parts, creating the necessary sealed environment. The amount of compression is dependent on the actual height of the limiting surfaces above the extent of the sidewalls. Using this aspect of the invention allows the compression of the gasket to be selected to match the gasket material and the amount of sealing force needed.

One other feature of the present invention is apparent from FIGS. 3 and 5. In these drawings, it can be seen that the gasket 86 is shaped to completely encircle the limiting surfaces 90 associated with the three screw holes 84. This feature reduces the amount of "creep" that can occur when the gasket 86 is compressed between the top cover 58 and the base casting.

Furthermore, of the other two limiting surfaces 88, one is also completely surrounded by the gasket 86, while the other simply acts to hold one corner of the gasket outward. Either of these two methods of arranging the gasket material will also aid in maintaining the alignment of the gasket 86 with the edges of the sidewalls 82 and thus insure the integrity of the seal upon assembly.

Modifications to the present invention may occur to a person skilled in the art after studying this disclosure. Therefore, the scope of the invention is to be limited only by the following claims.

What is claimed is:

1. An improved sealing apparatus for creating a sealed environment in a disc drive intended to prevent external contaminants from entering said sealed environment, comprising a generally planar rectangular base casting attached to which are the mechanical internal components to be protected, said components comprising a spindle motor on which at least one disc is mounted for rotation, said disc having a plurality of circular, concentric data tracks on which data may be written and from which data may be read, said components further comprising an actuator mechanism for controllably moving at least one read/write head into cooperative arrangement with said data tracks, said components being attached to said base casting in a specific geometric relationship to facilitate said cooperative arrangement between said read/write heads and said data tracks, said base casting further comprising a continuous periphery of upward extending sidewalls surrounding said protected components, said sealing apparatus further comprising a top cover adapted for attachment to said base casting and comprising a generally planar rectangular center section and a continuous periphery of downward extending sidewalls, said top cover being dimensioned such that said downward extending sidewalls will mate at their lower extremities with the upper extremities of said upward extending sidewalls of said base casting, said sealing arrangement further comprising a gasket having a thickness and formed and dimensioned to lie between said downward extending sidewalls of said top cover and said upward extending sidewalls of said base casting, said top cover also comprising three and only three widely separated attachment points for fixedly attaching said top cover to said base casting, said base casting also comprising three and only three attachment points located to align with said top cover attachment points, said top cover and base casting sidewalls also comprising limiting means for limiting the compression of said gasket when said top cover and said base casting are assembled together, said attachment points on said top cover and said base casting serving to form a planar junction as assembled, thus reducing distortion of said base casting and preserving said geometric relationship between said mechanical internal components.

2. An improved sealing apparatus as claimed in claim 1 wherein said sealing apparatus includes three and only three machine screws and said attachment points on said top cover are untapped clearance holes for said machine screws and said attachment points on said base casting are tapped holes for receiving said machine screws.

3. An improved sealing apparatus as claimed in claim 1 wherein said limiting means comprises limiting surfaces extending a fixed distance below said downward extending sidewalls of said top cover and similarly extending the same said distance above said upward extending sidewalls of said base casting, said limiting surfaces closely surrounding said attachment points, said fixed distance being equal to less than half of said thickness of said gasket and thus defining the amount of compression of said gasket when said top cover, said gasket and said base casting are assembled together.

4. An improved sealing apparatus as claimed in claim 3 wherein said gasket is formed in the areas of said attachment points to surround said attachment points and maintain the gasket in its intended position between said sidewalls of said top cover and said base casting.

5. An improved sealing apparatus as claimed in claim 1 wherein the first two of said three and only three attachment points are located in two adjacent corners of said rectangular top cover and said base casting and the third of said three and only three attachment points lies approximately at the mid-point of the side of said top cover and said base casting opposite the side defined by said first two attachment points.

6. An improved sealing apparatus as claimed in claim 2 wherein the first two of said three and only three attachment points are located in two adjacent corners of said rectangular top cover and said base casting and the third of said three and only three attachment points lies approximately at the mid-point of the side of said top cover and said base casting opposite the side defined by said first two attachment points.

7. An improved sealing apparatus as claimed in claim 2 wherein said limiting means comprises limiting surfaces extending a fixed distance below said downward extending sidewalls of said top cover and similarly extending the same said distance above said upward extending sidewalls of said base casting, said limiting surfaces closely surrounding said attachment points, said fixed distance being equal to less than half of said thickness of said gasket and thus defining the amount of compression of said gasket when said top cover, said gasket and said base casting are assembled together.

8. An improved sealing apparatus as claimed in claim 7 wherein said gasket is formed in the areas of said attachment points to surround said attachment points and maintain the gasket in its intended position between said sidewalls of said top cover and said base casting.

9. An improved sealing apparatus as claimed in claim 5 wherein said limiting means comprises limiting surfaces extending a fixed distance below said downward extending sidewalls of said top cover and similarly extending the same said distance above said upward extending sidewalls of said base casting, said limiting surfaces closely surrounding said attachment points, said fixed distance being equal to less than half of said thickness of said gasket and thus defining the amount of compression of said gasket when said top cover, said gasket and said base casting are assembled together.

10. An improved sealing apparatus as claimed in claim 9 wherein said gasket is formed in the areas of said attachment points to surround said attachment points and maintain the gasket in its intended position between said sidewalls of said top cover and said base casting.

11. An improved sealing apparatus as claimed in claim 6 wherein said limiting means comprises limiting surfaces extending a fixed distance below said downward extending sidewalls of said top cover and similarly extending the same said distance above said upward extending sidewalls of said base casting, said limiting surfaces closely surrounding said attachment points, said fixed distance being equal to less than half of said thickness of said gasket and thus defining the amount of compression of said gasket when said top cover, said gasket and said base casting are assembled together.

12. An improved sealing apparatus as claimed in claim 11 wherein said gasket is formed in the areas of said attachment points to surround said attachment points and maintain the gasket in its intended position between said sidewalls of said top cover and said base casting.

13. An improved sealing apparatus as claimed in claim 10 wherein said top cover and said base casting further comprise two contact surfaces located in the corners of said top cover and said base casting not occupied by said first two of said attachment points, said contact surfaces extending beyond the extremities of their respective sidewalls in the same direction and to the same or lesser extent as said limiting surfaces, said contact surfaces being generally in the form of circular pads, said contact surfaces further serving to maintain said gasket in said intended position.

14. An improved sealing apparatus as claimed in claim 12 wherein said top cover and said base casting further comprise two contact surfaces located in the corners of said top cover and said base casting not occupied by said first two of said attachment points, said contact surfaces extending beyond the extremities of their respective sidewalls in the same direction and to the same or lesser extent as said limiting surfaces, said contact surfaces being generally in the form of circular pads, said contact surfaces further serving to maintain said gasket in said intended position.

* * * * *